United States Patent [19]

Lamb

[11] 4,090,372
[45] May 23, 1978

[54] FUEL CONSERVATION CONTROLLER FOR CAPACITY CONTROLLED REFRIGERATION APPARATUS

[76] Inventor: Jeffrey Wayne Lamb, 172-41 Highland Ave., Jamaica Estates, N.Y. 11432

[21] Appl. No.: 779,735

[22] Filed: Mar. 21, 1977

[51] Int. Cl.² .................................................. F25B 15/00
[52] U.S. Cl. ............................................. 62/141; 62/148; 62/476
[58] Field of Search ............................ 62/141, 148, 476

[56] References Cited

U.S. PATENT DOCUMENTS

| 2,948,124 | 8/1960 | Emburg, Sr. | 62/141 |
| 3,750,419 | 8/1973 | Bawel | 62/141 |
| 3,837,174 | 9/1974 | Miyagi et al. | 62/476 |
| 3,864,930 | 2/1975 | Hopkins | 62/141 |

Primary Examiner—Lloyd L. King
Attorney, Agent, or Firm—Hubbell, Cohen, Stiefel & Gross

[57] ABSTRACT

Control system capable of controlling the refrigeration capacity of a refrigeration system adapted for cooling a fluid medium, the refrigeration system being of the type including a refrigerant; an absorbent having an affinity for the refrigerant; an evaporator for bringing the refrigerant into heat transfer relationship with the fluid medium, the evaporator having an inlet for receiving the fluid medium to be cooled in an outlet for discharging cooled fluid medium; an absorber in communication with the evaporator for removing refrigerant vapor therefrom; means for supplying a concentrated absorbent-refrigerant solution to the absorber; means for cooling the absorber to maintain the pressure therein below the pressure in the evaporator whereby refrigerant vapor migrates to the absorber to combine with the concentrated solution to produce a dilute solution; a concentrator for removing a portion of the refrigerant from the dilute solution for recirculation to the evaporator and for providing the concentrated solution; means for supplying the dilute solution to the concentrator; and means for controlling the concentration of the concentrated solution supplied to the absorber for controlling the refrigeration capacity of the refrigeration system. Control system includes means disposed for sensing the variations in temperature at the evaporator inlet and outlet and within the absorber for providing first, second and third tracking signal outputs indicative of the sensed temperature variations, the first tracking signal output being indicative of the variations in temperature of the fluid at the evaporator inlet, the second tracking signal output being indicative of the variations in temperature of the fluid at the evaporator outlet and the third tracking signal output being indicative of the variations in temperature in the absorber.

16 Claims, 2 Drawing Figures

FUEL CONSERVATION CONTROLLER FOR CAPACITY CONTROLLED REFRIGERATION APPARATUS

BACKGROUND OF THE INVENTION

1. Field of the Invention

This invention pertains to refrigeration systems and more particularly a control system for controlling the capacity of an absorption type refrigeration system.

2. Prior Art

Absorption type refrigeration systems for chilling a fluid medium which may then be used to provide refrigeration to any desired location are well known. Typically, such systems are controlled by providing a temperature sensor which senses the temperature of the fluid medium either as it enters or leaves the evaporator. The signal from this sensor is then used to control the capacity of the refrigeration system in accordance with the load requirements. In an absorption type refrigeration system, this is accomplished by controlling the concentration of the refrigerant-absorbent solution supplied to the absorber.

Other control systems, such as those disclosed in U.S. Pat. Nos. 3,099,139 and 3,250,084 employ two separate temperature sensors, one disposed to sense the temperature of the fluid medium entering the refrigeration system and another to sense the temperature of the fluid medium after it has been cooled by the refrigeration system. However, these control systems, as well as the other prior art control systems known to applicant, are only adapted to vary the refrigeration capacity of the system in response to varying load conditions and not in response to changes in the internal conditions in the refrigeration system itself. Thus, when there is a malfunction in the refrigeration system, such as fan breakage, fouling, accumulatipon of noncondensibles, etc., prior art control systems normally result in maximum energy input to the refrigeration system as they attempt to compensate for the malfunction. Thus, these control systems are extremely inefficient from a fuel consumption point of view.

Other exemplary refrigeration control systems are disclosed in U.S. Pat. Nos. 3,661,200; 3,667,246; 3,823,572; and 3,913,344.

SUMMARY OF THE INVENTION

The control system of the present invention is intended to reduce fuel consumption in an absoption type refrigeration system by varying the fuel input to the refrigeration system in response to changes in load as well as changes in the capacity of the refrigeration system, due, for example, to fouling, accumulation of noncondensibles, malfunctions in one or more of the components of the refrigeration system, etc.

According to the present invention, the control system comprises means disposed for sensing variations in the temperature of the fluid medium both as it enters and leaves the evaporator and for sensing variations in the temperature in the absorber. The sensing means provides first, second and third tracking signal outputs indicative of the sensed temperature variations, the first tracking signal output being indicative of the variations in temperature of the fluid medium at the evaporator inlet, the second tracking signal output being indicative of the variations in temperature of the fluid medium at the evaporator outlet and the third tracking signal output being indicative of the variations in temperature within the absorber. First comparator means operatively connected to the first and third tracking signal outputs are provided for comparing the first and third tracking signals and selecting one of them dependent on its relative value as compared with the other and for providing a first control signal output indicative of the selected tracking signal. Both the second tracking signal output and the first control signal output are operatively connected to a reset control means which provides a second control signal output dependent on the relative values of the second tracking signal and the first control signal. The first and second tracking signal outputs are also operatively connected to a difference means which provides a third control signal output indicative of the difference between the first and second tracking signals. The control system also includes a second comparator means operatively connected to the second and third control signal outputs for comparing the second and third control signals and selecting one of them based upon its relative value as compared with the other and for providing a fourth control signal output indicative of the selected control signal. The fourth control signal is then used to control the component of the refrigeration system which controls the concentration of the refrigerant absorbent solution supplied to the absorber.

By properly initially calibrating the output from the sensing means, the first and second comparator means, the reset control means and the difference means, the control system of the present invention may be adapted for use with any absorption type refrigeration system.

The control system of the present invention operates to reduce fuel input to the refrigeration system whenever the fuel is being inefficiently used due to changes in internal operating temperatures of the refrigeration system. Further, the control system is designed to vary the leaving chilled water temperature in response to changes in load thereby further reducing fuel consumption by the refrigeration system.

These as well as further features and advantages of the control system according to the present invention will become more fully apparent from the following detailed description and annexed drawings of the preferred embodiments thereof.

DETAILED DESCRIPTION OF THE PREFERRED EMBODIMENTS

Figure 1:
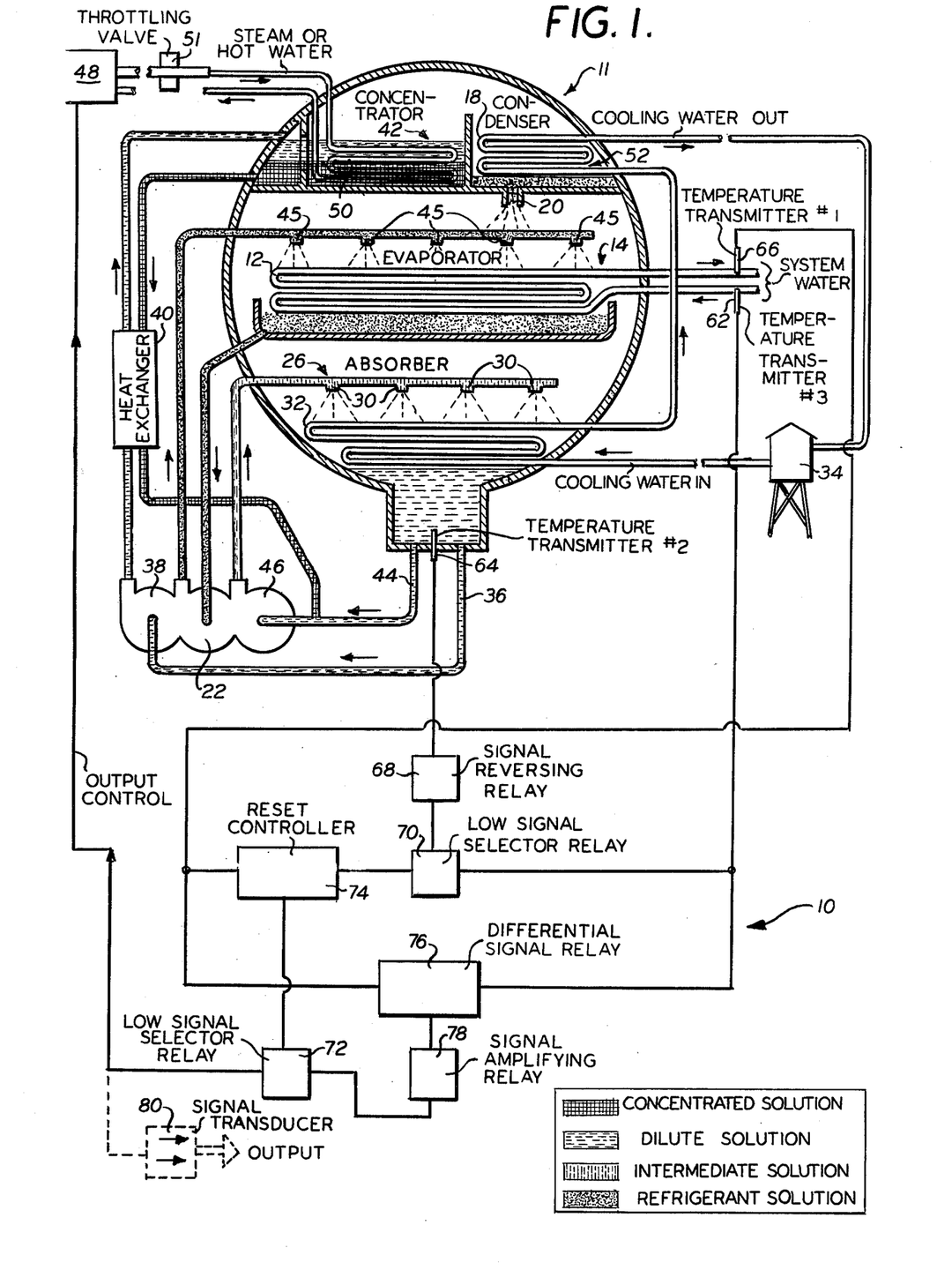
FIG. 1 is partially a diagrammatic partially schematic view illustrating the preferred control system according to the present invention together with an absorption type refrigeration system whose operation is to be controlled.

Referring now to FIG. 1, the preferred control system 10 of the present invention is illustrated together with a conventional refrigeration system 11 whose operation is to be controlled.

Conventional refrigeration system 11 is of the absorption type and includes evaporator 14, condenser 18, absorber 26, and concentrator 42.

In operation the fluid medium to be chilled is circulated through a coil 12 in the evaporator 14. Since the fluid medium is most commonly water it will be assumed for purposes of this description that water (hereinafter referred to as the system water) is circulating through coil 12. Skilled art workers will recognize however, that other liquids may also be employed.

A refrigerant enters evaporator 14 from condenser 18 through orifice 20. The evaporator pressure is maintained at a low enough level to vaporize a portion of the refrigerant as it passes through the orifice 20. As the refrigerant vaporizes it absorbs its latent heat of vaporization thereby cooling and condensing the remainder of the refrigerant which collects at the bottom of the evaporator 14. The liquid refrigerant is then fed through evaporator pump 22 to spray trees 45 which spray the refrigerant on the coil 12. This is desirable to insure that coil 12 will be uniformly wetted by the refrigerant at all times.

As the refrigerant contacts the coil 12 it extracts heat from the water therein which has the dual effect of cooling the system water and causing the refrigerant to boil. The vaporized refrigerant then passes into the absorber 26 which is maintained at a pressure slightly lower than the pressure in the evaporator 14.

In the absorber 26, an absorbent having a strong affinity for the refrigerant and a boiling point much higher than the refrigerant is sprayed through spray trees 30 onto the refrigerant vapor.

The most commonly used refrigerant-absorbent combination is water and lithium bromide (LiBr). Water is a preferred refrigerant since it possesses a high latent heat of vaporization which serves to minimize the amount of refrigerant necessary to provide a given amount of cooling. In addition, water has a low specific volume which serves to reduce the volume of refrigerant which must be transported; a working pressure near atmospheric which reduces the problem of leaks thereby lessening the cost of machine design; and is safe, stable and readily available at low cost. LiBr is preferred principally because with respect to water it is an excellent absorbent.

In the absorber 26 the refrigerant vapor eminating from the evaporator condenses in the liquid LiBr solution to form a dilute solution which collects at the bottom of the absorber 26. The heat of condensation given up by the refrigerant during this process is removed by condensing water which circulates through a coil 32 disposed in the absorber 26. The condensing water may come, for example, from a cooling tower 34.

As shown, the dilute solution collected at the bottom of the absorber 26 passes out of the absorber in two controlled streams. One stream 36 passes into a pump 38 which pumps the solution into the concentrator 42. In the concentrator 42 the refrigerant is boiled out of the dilute solution thus producing a concentrated refrigerant-absorber solution, i.e. one that has a higher percentage concentration of absorbent than the dilute solution. The concentrated LiBr solution is then mixed with the second controlled stream of dilute solution 44. Mixed together, these solutions produce an intermediate refrigerant-absorbent solution, i.e., one in which the percentage of absorbent is somewhere between that found in the concentrated and dilute solutions. This will be more fully explained hereinafter. Absorber pump 46 then pumps this intermediate solution into the absorber 26 through spray trees 30 as is more fully described above.

It will be apparent that heat must be supplied to the dilute solution in the concentrator 42 to raise the temperature high enough to drive out the water vapor. Most commonly, and is shown in FIG. 1, this is accomplished by circulating steam from a low pressure steam source 48 through a coil 50 disposed in the concentrator 42, the steam temperature being maintained at a value high enough to boil out the refrigerant yet below the boiling point of the absorbent. Typically, water will boil out of the dilute solution at about 210° F while the boiling point of LiBr is about 1500° F. Consequently, the steam from source 48 is maintained at a temperature between these two values. The water vapor boiled out of the LiBr solution in the concentrator 42 migrates to the condenser 18 which is maintained at a slightly lower pressure than the pressure found in the concentrator.

A coil 52, through which cooling water is circulated, is disposed in the condenser 18. As shown, the water in coil 52 is the same water which has first been circulated through coil 32. This is done since, as will become more fully apparent hereinafter, the condenser is typically maintained at a temperature about 10° F higher than absorber temperature. After passing through coil 52 the condensing water is returned to tower 34 for recooling.

Upon contacting coil 52 the vaporized refrigerant is cooled and condensed. The liquid refrigerant collects at the bottom of the condenser and eventually passes through the orifice 20 into the evaporator 14 thereby completing the refrigerant cycle.

Since the stream 36 of dilute solution must be heated in the concentrator 42 in order to drive out the refrigerant, and since the concentrated LiBr solution returned to the absorber 26 must be sufficiently cooled to maintain a constant absorber temperature, the system 11 will generally include a heat exchanger 40. As shown, the stream 36 of dilute solution passes through the heat exchanger 40 in one direction and the hotter concentrated solution passes through the heat exchanger 40 in the opposite direction. In the exchanger the dilute solution takes on heat and therefore requires less heat input in the concentrator 42 from source 48 while the concentrated solution gives up heat thus requiring less cooling in the absorber 26 to lower its temperature.

Figure 2:
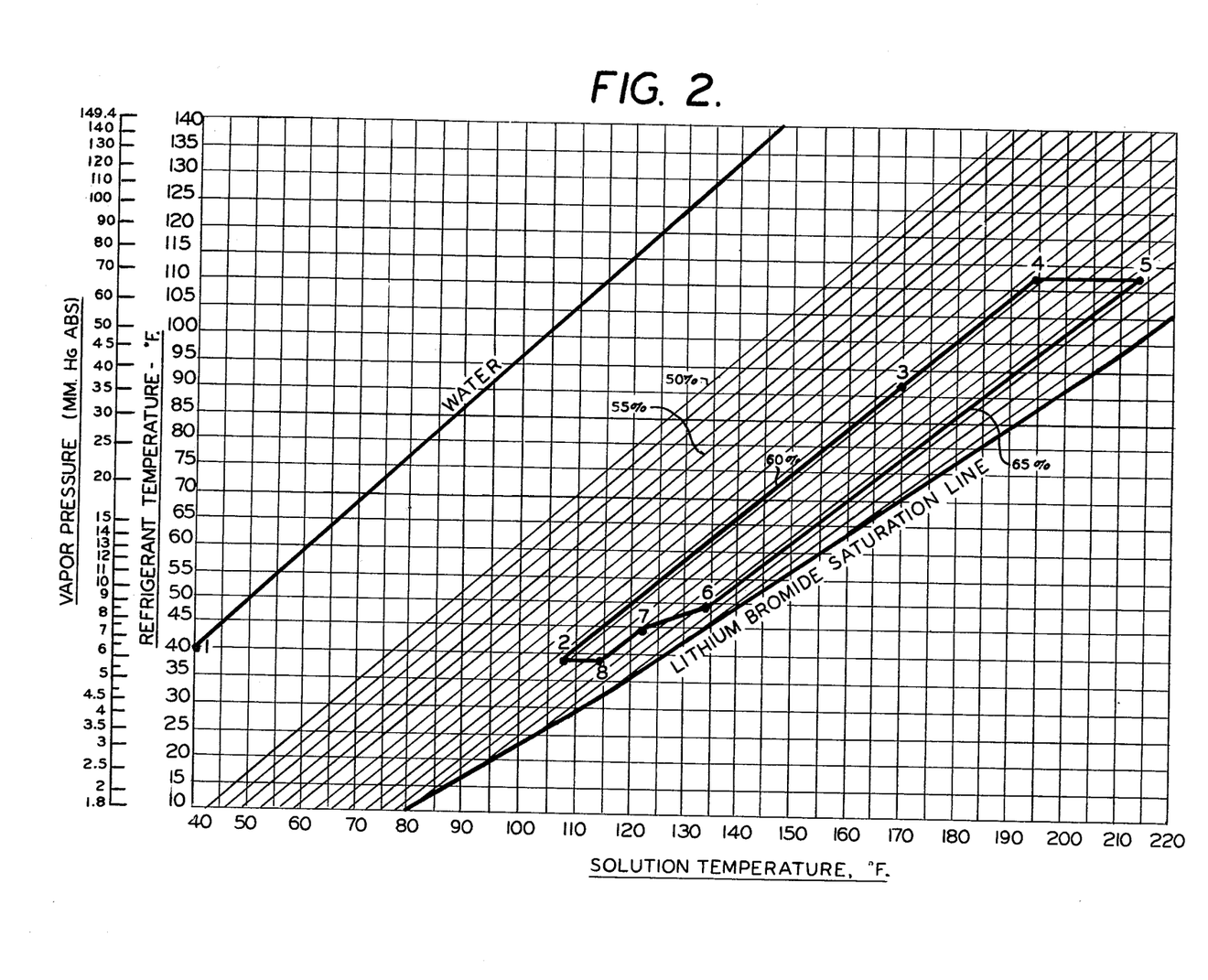
FIG. 2 is a graph illustrating the pressure temperature curves for the lithium-bromide solution at various points throughout the refrigeration cycle.

Referring now to FIG. 2, which graphically illustrates the pressure-temperature curves for water and lithium bromide, the changes in pressure and temperature that occur throughout the system 11 will be more fully described.

Assuming that the system 11 is to cool the system water to 45° F, the refrigerant must vaporize at a temperature of about 40° F. Thus, with reference to FIG. 2, the evaporator pressure must be maintained at about 6.5 MM Hg (point 1). Since the evaporator pressure must be slightly higher than the absorber pressure to insure that the vaporized refrigerant passes to the absorber, the absorber is maintained at a pressure of about 6.0 MM Hg. Depending upon the temperature in the absorber, this pressure will exist for various concentrations of the LiBr solution. The absorber temperature, however, is directly dependent upon the temperature of the water entering the coil 32. Since the water in the cooling tower 34 is typically 85° F, which, assuming that the surface area of the coil 32 is kept at an economical level, means that the absorber temperature will be about 107° F, it may be seen from FIG. 2 that the concentration of the dilute solution in the absorber must be about 60% (point 2) to keep the pressure in the absorber below the evaporator pressure.

As the stream 36 of dilute solution passes out of the absorber 26 it first passes through the heat exchanger 40 where its temperature is raised to about 170° F (point 3). Thus point 3 represents the condition of the dilute solution as it enters the concentrator 42. In the concentrator 42 the steam from source 48 passing through coil 50 adds additional heat to the dilute solution until the vapor pressure of the solution reaches the condenser pressure at which point equilibrium is disrupted as some of the water molecules boiled out of the solution pass into the condenser 18.

In order to insure that water vapor will migrate from the concentrator 42 to the condenser 18 the pressure in the concentrator must be raised to a level slightly above the pressure in the condenser 18 which, in turn, is directly dependent on the condenser temperature. As noted above, the same water used to cool the absorber 26 is also used to cool the condenser 18. Thus, the temperature of the water entering condenser coil 52 will be at about 95° F, which means that the temperature in the condenser 18 will typically be about 115° F. At this temperature the condensing pressure of the refrigerant is about 78 MM Hg. Therefore, when the vapor pressure of the 60% solution exceeds about 78 MM Hg, a portion of the water vapor molecules in the concentrator will migrate to the condenser 18. As shown in FIG. 2, the pressure of the 60% solution entering the concentrator will reach 78MM Hg at a temperature of about 195° F (point 4). Therefore, assuming that the heat transfer surface in the concentrator is to be maintained at an economical figure, the steam entering coil 50 in the concentrator must be at about 245° F.

For a fixed flow rate of dilute solution in the concentrator, the final concentration of the LiBr solution may be controlled by controlling the rate of steam flow into the concentrator 42. By maintaining the steam pressure at about 12 PSIG the solution concentration at the output of the concentrator will be about 65%. This is shown at point 5, with the line 4-5 representing the latent of vaporization of the refrigerant.

After passing through the heat exchanger 40 which reduces the temperature of the concentrated solution to about 135° F (point 6), the concentrated solution is mixed with the second stream 44 of dilute solution to produce an intermediate solution (point 7).

The intermediate solution is necessary for a number of reasons, the foremost of which is to prevent crystillization of the LiBr. With reference to FIG. 2 it can be seen that point 6 is quite close to the crystillization line for LiBr. Consequently, if the concentrated solution were further cooled from this point without diluting its concentration, some crystillization would probably occur. Another reason is that by spraying a less concentrated solution on the coil 32, and hence a less viscous one, the surface of the coil 32 will be more completely wetted.

The reason the solution is concentrated to a high percentage concentration in the concentrator 42 and then diluted is that the absorber 26 requires a higher rate of solution flow than the concentrator does. Thus while the proper solution flow rate in the absorber is maintained by recirculating a portion (stream 44) of the dilute solution, this necessitates over concentrating the solution in the concentrator 42 in order that the intermediate solution sprayed on the coil 32 through spray trees 30 will have the proper orientation.

Spraying the intermediate solution through absorber trees 30 onto coil 32 further cools the intermediate solution to point 8 in FIG. 2. At this point the intermediate solution has the capacity to absorb additional water (refrigerant) vapor molecules from the evaporator. The more water vapor absorbed by the intermediate solution the more dilute it becomes, the limit being imposed by the cooling available in the absorber 26. By maintaining the absorber temperature at about 105° F the final concentration of the dilute solution will be about 60% (point 2). In FIG. 2 the line 10-3 represents the heat of condensation given up by the refrigerant as it condenses.

Since the flow rate of system water through coil 12 is generally constant, it is necessary to maintain a given temperature and concentration of lithium bromide solution in the absorber 26 in order for the system 11 to produce a given amount of refrigeration. For example, assuming the concentration of the solution in the absorber 26 were reduced, the ability of the solution to absorb water vapor molecules migrating from the evaporator 14 would also be reduced which in turn would lower the refrigeration capacity of the system 11. On the other hand, if there is an increase in the concentration of the lithium bromide solution in the absorber 26, the solution will be capable of absorbing more water vapor molecules which, in turn, will increase the refrigeration capacity of the system.

As is more fully described above, the concentration of the solution in the absorber is directly dependent upon the rate of flow of steam through the coil 50 in the concentrator 42. As the flow rate of the steam increases more refrigerant is driven out of the dilute solution in the concentrator with the result that the final concentration of the solution leaving the concentrator 42 is increased. This in turn results in an increase in the concentration of the intermediate solution fed into the absorber 26 through the spray trees 30. On the other hand, a decrease in the flow rate of steam through the coil 50 serves to reduce the amount of refrigerant driven out of the dilute solution which results in a decrease in concentration of the solution leaving the concentrator 42. This in turn will result in a decrease in the concentration of the intermediate solution in the absorber 26.

It is therefore obvious that the capacity of the machine may be controlled by regulating the concentration of the solution entering the absorber 26. This may be done, for example, by disposing a three way valve (not shown). On the line going to the concentrator 40, the valve may then be controlled to bypass the concentrator 40 and feed a portion of the dilute solution directly back to the absorber 26 thus reducing the concentration of the intermediate solution supplied to the absorber. Most commonly, however, this has been accomplished by disposing a single temperature sensor at the output of the cooling coil 12 in the evaporator. The output of this temperature sensor is used to control a throttling valve 51 which is placed on the input line of the coil 50. Should the temperature sensor detect a rise in the supply water temperature, the throttling valve 51 will be opened wider thereby increasing the heat input to the concentrator 42. As is more fully described above, this will result in an increase in the concentration of the intermediate solution which will increase the cooling capacity of the system 11. Conversely, if the temperature sensor detects a drop in supply water temperature the throttling valve 51 will be positioned to reduce the heat input to the concentrator 42 which results in a decrease in the concentration of the intermediate solution in the absorber 26. This in turn will decrease the cooling capacity of the system 11.

This type of capacity control, however, has a number of deficiencies. Specifically, it is designed to maintain the supply water at a constant temperature regardless of the load. Thus, assuming that the load on the system 11 decreases, which is reflected by a lower return water temperature, the supply water temperature will also tend to decrease. As is more fully described above, when the temperature sensor detects the drop in supply water temperature, the control system will respond by reducing the amount of steam admitted to the system 11 thereby decreasing the concentration of the intermediate solution and reducing the cooling capacity of the system. Thus it can be seen that the system will compensate for the reduced load by reducing the temperature differential between the supply and return water while maintaining the temperature of the supply water at a constant low level. From a fuel consumption point of view this is wasteful since additional energy (steam) is required to pull down the temperature of the return water.

In addition, none of the prior art control systems known to applicant is capable of reducing energy consumption under conditions when maximum system efficiency is reduced due to variations in internal system conditions such as those that result, for example, from an increase in the temperature of the cooling water, branch tube fouling, accumulation of incondensables, etc.

Referring now again to FIG. 1, the energy conservation control system 10 of the present invention will now be described.

As shown, the preferred system 10 includes three separate temperature sensors 62, 64, 66, a signal reversing relay 68, a pair of low signal selector relays 70, 72, a reset controller 74, a differential signal relay 76 and a signal amplifying relay 78.

While the components of the control system 10 may be pneumatic, hydraulic, fluidic, electronic, electric or any combination thereof, the preferred system 10 is pneumatic. Accordingly, each of the sensors 62, 64, 66 is a transducer whose output is a pneumatic signal proportional to the sensed temperature.

As shown, the first temperature sensor 62 is disposed at the input of the cooling coil 12 and tracks the temperature of the return water; the second temperature sensor 64 is disposed in the sump at the bottom of the absorber 26 and tracks the temperature of the dilute solution; and the third temperature sensor 66 is disposed at the output of the coil 12 and tracks the temperature of the supply water.

Initially, each of the temperature transmitters 62, 64, 66 is set to provide a given output pressure for predetermined equilibrium operating conditions. For purposes of this description it will be assumed that temperature transmitter 62 is set to provide an output pressure signal of 9.5 PSIG when the return water temperature is 55° F; temperature transmitter 64 is set to provide an output pressure signal of 10 PSIG when the dilute solution temperature is 98° F; and temperature transmitter 66 is set to provide an output pressure signal of 7.5 PSIG when the supply water temperature is 45° F.

Any change in the temperature sensed by any one of the transmitters will then result in a change in the output pressure tracking signal generated by that transmitter. Preferably, the output pressure signals from the transmitters will vary by 0.12 PSIG per 1° F change in sensed temperature, an increase in sensed temperature resulting in a corresponding increase in the output pressure and a decrease in the sensed temperature resulting in a decrease in the output pressure.

As shown, the output pressure signal from temperature transmitter 64 is first applied to a signal reversing relay 68. The signal reversing relay serves to reverse any incremental change in the output pressure from the transmitter 64 in response to a change in the temperature in the dilute solution. Thus, for example, should the dilute solution temperature increase by 5°, which would result in a 0.6 PSIG increase in output pressure from the transmitter 64, this will be reflected as a 0.6 PSIG decrease in the output pressure from the signal reversing relay 68. Following this example, the output pressure from the signal reversing relay 68 will be 9.4 PSIG.

As shown, the output from the relay 68 is then compared with the output from the temperature transmitter 62 by the first low signal selector relay 70 which selects the signal having the lower pressure and passes that signal on as a control signal to the reset controller 74.

As shown, the output pressure control signal of reset controller 74, which is applied to the second low signal selector relay 72, is affected by the outputs from both the temperature transmitter 66 and the low signal selector relay 70. The output pressure of controller 74 is initially set by the signal received from transmitter 66 and then reset up or down depending on the signal received from low signal selector relay 70. In FIG. 1, an increase in the output pressure from either temperature transmitter 66 or relay 70 will be reflected by an increase in the output pressure from the reset controller 74. Similarly, a decrease in the output pressure from either transmitter 66 or relay 70 will result in a decrease in the output pressure from the reset controller 74.

As shown, the output pressure signals from the temperature transmitters 62, 66 are also applied to the differential signal relay 76. The output pressure control signal from the relay 76, which is applied to the signal amplifying relay 78, is indicative of the difference between the output pressures from the temperature transmitters 62, 66. Signal amplifying relay 78 then amplifies the output from the relay 76 before it is applied to the second low signal selector relay 72. As will be more fully understood hereinafter, the gain of amplifier 78 is selected such that as long as system 11 is functioning properly the output from relay 78 will be more than the output from reset controller 74.

Low signal selector relay 72, whose inputs comprise the output from controller 74 and the amplified output from the differential signal relay 76 functions in the same manner as the first low signal selector relay 70. Thus, the output pressure control signal from relay 72 will be the input signal having the lower pressure.

As shown, the output pressure control signal from the relay 72 is used to control the steam input throttling valve 51. The operation of the valve 51 in response to the output pressure from the relay 72 will be more fully explained hereinafter. Assuming that the equilibrium of the system 11 remains undisturbed, that is, that the supply water temperature remains at 55° F, the return water temperature remains at 45° F and the dilute solution temperature remains at 98° F the output pressures from the transmitters 62, 64, 66 will be 10.0 PSIG, 10 PSIG and 8.8 PSIG, respectively. In the absence of any variation in these output pressures, the input pressure signals to the reset controller 74 from the temperature transmitter 66 and from the low signal selector relay 70 will be 8.8 PSIG and 10.0 PSIG respectively. In response to these input pressures the output pressure from the reset controller 74 will initially be set at 8.5 PSIG. Assuming this output pressure signal is passed through low signal selector relay 72 to throttling valve 51, it will position the valve to admit sufficient steam to maintain the concentration of the solution leaving the concentrator 42. As long as the concentration of the solution leaving the concentrator 42 remains the same, and as long as the load on they system 11 as well as the internal operation conditions of the system remain the same, the supply water temperature will remain at 45° F.

It is also apparent from FIG. 1 that the inputs to the differential signal relay 76 from the temperature transmitters 62, 66 will be 10.0 PSIG and 8.8 PSIG respectively. Under these conditions the output from the relay 76 will initially be adjusted to 2.0 PSIG. Assuming that relay 78 has a gain of 10, the output pressure signal from the relay 78 will then be 20 PSIG. Thus it is apparent that since the output pressure from the reset controller 74 is lower than the output pressure from the relay 78, low signal selector relay 72 will pass the signal from controller 74 to throttling valve 51.

Assume now that the load on the system 11 decreases sufficiently to reduce the return water temperature by 5° F thus decreasing the output pressure from the temperature transmitter 62 by 0.6 PSIG to 9.4 PSIG. Assuming that the system 11 is functioning properly, the temperature of the dilute solution as sensed by the temperature transmitter 64 will remain unchanged. It will thus be apparent that the output signal from the low signal selector relay 70 will now be 9.4 PSIG. This in turn will result in a decrease in the output pressure from the reset controller 74 to a value less than 8.5 PSIG.

The reduction in return water temperature will also reduce the output signal from the differential relay 76 to 1.5 PSIG. Multiplying this signal by the gain in the amplifier 78, the output pressure signal from relay 78 will now be 15 PSIG. Since the output pressure signal from reset controller 74 is still lower than the signal from the relay 78, the low signal selector relay 72 will still pass the signal from the controller 74 to throttling valve 51. In response to the reduction in pressure from low signal selector relay 72, throttling valve 51 will close thereby admitting less steam to the concentrator 42. As is more fully described above, the result will be a lower solution concentration leaving the concentrator 42 and a decrease in the cooling capacity of the system 11.

After a time lag inherent in the system 11, the temperature of the supply water will begin to rise and the output pressure from transmitter 66 will increase. The result is an increase in the output pressure from the controller 74. Because the gain of the amplifier 78 is sufficiently high, the low signal selector relay 72 will continue to pass the signal from reset controller 74 to throttling valve 51. This time, however, because the output pressure signal from the relay 72 has increased, the throttling valve 51 will be opened wider to admit more steam to the concentrator 42 thereby increasing the refrigeration capacity of the system 11. This in turn will reduce the temperature of the supply water. However, the supply water temperature now will be at some value above 45° F. This decrease in supply water temperature will eventually result in a decrease in the return water temperature. This time, however, the new return water temperature will be somewhat greater than 50° F. Thus, it can be seen that this process will continue until the return and supply water temperatures reach a new point at which the system 11 is again in equilibrium. Clearly, when this point is reached the supply water temperature will be greater than 45° F and the return water temperature will be greater than 50° F. Thus, as opposed to a conventional controller in which a signal transmitter is disposed in the supply water line and the signal from the transmitter operates the valve 51 to maintain the supply water temperature at a constant value, the control system 10 of the present invention, by sensing the return water temperature, "anticipates" load changes on the system 11 and allows both the supply and return temperatures to seek out higher values in which the system 11 will once again be in equilibrium.

From an energy conservation point of view, this has two principal advantages. First, resetting the supply water temperature at a higher value obviates the necessity of pulling the return water temperature value down sufficiently to maintain the supply water temperature at a lower, constant value. Accordingly, less energy (steam) input to the system 11 is required. Since the load on the system 11 may be varying constantly, this can result in significant energy savings. Second, resetting both the supply and return water temperatures at higher values results in an increase in the temperature mean between these two temperatures. Consequently, there is greater temperature differential between said mean and the temperature in the evaporator 14 which in turn results in an increase in the rate of heat transfer from the coil 12 to the refrigerant. Since the flow rate of the system water is constant, this results in a further energy savings.

The control system 10 of the present invention exhibits further advantages when system 11 exhibits loss in refrigeration capacity due to the accumulation of noncondensables. Normally, noncondensables migrate to the absorber which is the lowest pressure area in the system 11. This results in higher pressures in the absorber 26 and consequently a higher temperature in the evaporator 14 which reduces the load on both the evaporator and the absrober.

If the system were functioning properly, that is, without noncondensables, a reduction in absorber load would normally be accompanied by closing of the valve 51 and a reduction in the concentration of the intermediate solution supplied to the absorber 26. However, when the reduction in absorber load is caused by the accumulation of noncondensables, the system 11 will normally be calling for full load. This means that throttling valve 51 is wide open and the solution leaving the concentrator 42 and hence the intermediate solution in the absorber 26 are at their maximum concentrations. Since the temperature in the absorber 26 will be abnormally low, the temperature of the dilute solution flowing through heat exchanger 40 toward concentrator 42 will also be low. With reference to FIG. 2 it may be seen that if the 65% solution leaving concentrator 42 is sufficiently cooled by the dilute solution in the heat exchanger 40, the saturation point of the concentrated solution may be reached with the result that crystillization of the absorbent will occur in the heat exchanger. When crystillization does occur the system 11 normally has to be shut down and sufficiently heated to permit the absorbent to reliquify.

In order to avoid this problem many absorber type refrigeration systems include a purge unit which is intended to remove noncondensables from the system during operation. However, current purge systems are incapable of removing all noncondensables from the system 11.

With reference to FIG. 1 it may be seen that if the load on the system 11 and the flow of system water through the coil 12 remain constant while the capacity of the system 11 is reduced due to the accumulation of noncondensables, the system 11 will be incapable of sufficiently cooling the system water with the result that the supply water temperature will eventually approach the return water temperature. The net effect will be a reduction in the output pressure signal from the differential relay 76. At some point, as determined by the gain of the signal amplifying relay 78, the output pressure signal from relay 78 will be lower than the output pressure signal from the reset controller 74. The result is a reduced output pressure control signal from the relay 72 which keeps valve 51 from opening any further thus setting an upper limit on the concentration of the solution leaving concentrator 42. This has two advantageous effects. First, the concentrated solution leaving concentrator 42 can be cooled to a lower temperature without crystillization of the absorbent. Second, it reduces the steam input to the system 11 thereby reducing fuel consumption. This is desirable since the steam being supplied to the system 11 is being inefficiently used. Skilled art workers will immediately recognize that the gain of the signal amplifying relay 78 may be set such that the output from relay 78 controls throttling valve 51 only when the accumulation of noncondensibles reaches an intolerable level.

Preferably some form of conventional indicating means (not shown), such as a light, will be operatively connected to either the output from differential relay 76 or signal amplifying relay 78 which would be activated any time the difference between the return and supply temperatures dropped below a predetermined value. The indicating means could then be monitored and would tell the system operator that the accumulation of non-condensables in the system 11 has reached such a high level that removal thereof is required. Until this can be effected, the system 10 will continue to control throttling valve 51 to reduce the possibility of absorbent crystallization and conserve fuel.

Assume now that the system 11 is operating properly except that there is decrease in the ability of the cooling water from tower 34 to absorb heat from the absorber 26 and condenser 18. This may result from, for example, a malfunction in the fan which cools the water which is recirculated to the tower 34 or, more commonly, by fouling of the tubes 32, 52. The result is an increase in the temperatures and pressures in both the absorber 26 and condenser 18.

As is more fully described above, an increase in the pressure in the condenser 18 will increase the pressure to which the solution in the concentrator 42 must be raised before migration of the refrigerant vapor from the concentrator 42 to the condenser 18 will occur. In other words, the refrigerant producing capability of the concentrator 42 will be reduced. This in turn will result in an increase in the supply water temperature which would normally call for the throttling valve 51 to be opened wider. However, while this may allow system 11 to temporarily maintain a sufficiently low supply water temperature, eventually, even with throttling valve 51 wide open, the system 11 will be unable to handle the load and the supply water temperature will begin to rise. It is therefore clear that under these conditions there is a point at which the energy consumption of the system 11 is so inefficient that it is no longer feasible for throttling valve 51 to remain open. Control system 10 of the present invention is designed to take this condition into account.

Thus, as the temperature in the absorber 26 begins to rise, the temperature of the dilute solution accumulating in the bottom of the absorber will also rise. This temperature rise will be sensed by the transmitter 64 and the output pressure from the signal reversing relay 68 will decrease. At some point as the temperature of the dilute solution continues to rise, the output from the signal reversing relay 68 will drop below the output pressure from the temperature transmitter 62. This means that the low signal selector relay 70 will now pass the pressure signal from the relay 68 to controller 74. Thus, the output pressure signal from relay 68 sets an upper limit on the input to reset controller 74 from relay 70. If desired, the output pressure signal from the temperature transmitter 64 could also be fed to some form of indicating means which could then be monitored. When the output pressure signal from the transmitter 64 reached a predetermined level, the indicating means would be activated meaning that there is some malfunction in the cooling system of the system 11 which should be remedied.

Thus, under these conditions control system 10 conserves energy by more rapidly indicating malfunctions in the system 11 thereby reducing the period during which system 11 functions inefficiently. Further energy is conserved by controlling valve 51 to reduce steam input to the system during those periods when the steam is being used inefficiently.

All the components of the control system 10 illustrated in FIG. 1 are conventional. Thus temperature transmitters 62, 64, 66 may comprise, for example, Johnson Service Company's Model T-5210 remote bulb temperature transmitter; signal reversing relay 68 may comprise, for example, Powers Regulator Company's Model # 2430009, Multi-Purpose Relay; low signal selector relays 70, 72 may comprise, for example, Powers Regulator Company's Model # 2430009, Multi-Purpose Relay; reset controller 74 may comprise, for example, Johnson Service Company's Model # T-9020, Fluidic Reset Controller; differential signal relay 76 may comprise, for example, Powers Regulator Company's Model # 2430009, Multi-Purpose Relay; and signal amplifying relay 78 may comprise, for example, Johnson Service Company's Model # T-5312, Receiver Controller.

Normally, throttling valve 51 will be part of the refrigeration system 11 whose operation is to be controlled. In the event the control system 10 is pneumatic, for example, and throttling valve 51 is an electrically operated valve, the output pressure signal from the low signal selector relay 72 could first be fed to a suitable signal transducer 80 which would convert this pressure signal to a suitable electrical signal. The output from the transducer 80 could then be used to control the throttling valve 51.

In those refrigeration systems which employ, for example, a boiler to generate steam which is then fed into the concentrator 42, the output from the low signal selector relay 72, instead of controlling the throttling valve 51, could be directly used to control the heat input to the boiler. In fact, it is contemplated that the output of relay 72 be used to control whatever means are employed to control the capacity of the refrigeration system.

Also, numerous other components other than those illustrated in FIG. 1 may be employed to effect the type of control described above. Thus it should be recognized that the components of control system 10 illustrated in FIG. 1 as well as their arrangement are merely exemplary of the many different components which may be employed to effect the type of control described above.

In addition, while temperature transmitter 64 is shown in FIG. 1 as being disposed in the sump at the bottom of the absorber 26, this is not necessary. Thus, transmitter 64 could be disposed in any suitable location as long as the sensed temperature was indicative of the temperature in the absorber 26. For example, transmitter 64 could be disposed in the flow path of one of the streams 36, 44.

Skilled art workers will immediately recognize that the initial calibration of temperature transmitters 62, 64, 66, reset controller 74, and the gain of the signal amplifying relay 78 will be dependent upon the particular refrigeration system in connection with which the control system 10 of the present invention is employed. Thus it should be understood that the values given in the above detailed description are strictly exemplary.

Since these and other changes and modifications are within the scope of the present invention, the above description should be construed as illustrative and not in a limiting sense.

What is claimed is:

1. A control system capable of controlling the refrigeration capacity of a refrigeration system adapted for cooling a fluid medium, said refrigeration system including a refrigerant; an absorbent having an affinity for said refrigerant; evaporator means for bringing said refrigerant into heat transfer relationship with said fluid medium, said evaporator means having an inlet for receiving fluid medium to be cooled and an outlet for discharging cooled fluid medium; absorber means in communication with said evaporator means for removing refrigerant vapor therefrom; means for supplying a concentrated absorbent-refrigerant solution to said absorber means; means for cooling said absorber means to maintain the pressure therein below the pressure in said evaporator means whereby said refrigerant vapor migrates to said absorber means to combine with said concentrated solution to produce a dilute solution; concentrator means for removing a portion of said refrigerant from said dilute solution for recirculation to said evaporator means and for providing said concentrated solution; means for supplying dilute solution to said concentrator means for controlling the concentration of said concentrated solution supplied to said absorber means for controlling the refrigeration capacity of said system, said control system comprising:

means disposed for sensing the variations in temperature at said evaporator inlet and outlet and within said absorber means for providing first, second and third tracking signal outputs indicative of said sensed temperature variations, said first tracking signal output being indicative of the variations in temperature of said fluid at said evaporator inlet, said second tracking signal output being indicative of the variations in temperature of said fluid at said evaporator outlet and said third tracking signal output being indicative of the variations in temperature within said absorber means;

first comparator means operatively connected to said first and third tracking signal outputs for comparing said first and third tracking signals and selecting one of said tracking signals dependent on its relative value as compared with the other of said tracking signals and for providing a first control signal output indicative of said one selected tracking signal;

reset control means operatively connected to said second tracking signal output and to said first control signal output for providing a second control signal output dependent on the relative values of said second tracking signal and said first control signal;

difference means operatively connected to said first and second tracking signal outputs for providing a third control signal output indicative of the difference between said first and second tracking signals; and second comparator means operatively connected to said second and third control signal outputs for comparing said second and third control signals and selecting one of said last mentioned control signals dependent upon its relative value as compared with the other control signal and for providing a fourth control signal output indicative of said one selected control signal, said fourth control signal output being connected to said concentration control means for controlling the operation thereof dependent on the value of said fourth control signal.

2. The control system according to claim 1 wherein said sensing means comprises a first temperature sensor disposed at said evaporator inlet, the output of said first temperature sensor comprising said first tracking signal output, a second temperature sensor disposed at said evaporator outlet, the output of said second temperature sensor comprising said second tracking signal output, and a third temperature sensor disposed within said absorber means, the output of said third temperature sensor comprising said third tracking signal output.

3. The control system according to claim 1 wherein said sensing means includes means for setting each of said tracking signal outputs to provide predetermined output signal at predetermined temperatures, and wherein the absolute value of the change in each of said tracking signal outputs in response to a given change in temperature is the same.

4. The control system according to claim 3 wherein said first and second tracking signals increase in response to an increase in the temperature sensed by their respective temperature sensors and decrease in response to a decrease in the temperature sensed by their respective temperature sensors and wherein said third tracking signal decreases in response to an increase in the temperature sensed by the third temperature sensor and inreases in response to a decrease in the temperature sensed by the third temperature sensor.

5. The control system according to claim 4 wherein said one selected tracking signal selected by said first comparator means is the one having the lower value.

6. The control system according to claim 5 wherein said second control signal output provided by said reset control means increases in response to an increase in either said second tracking signal output or said first control signal output and decreases in response to a decrease in either said second tracking signal output or said first control signal output.

7. The control system according to claim 6 wherein said third control signal output provided by said difference means increases in response to an increase in the difference between said first and second tracking signals and decreases in response to a decrease in the difference between said first and second tracking signals.

8. The refrigeration system according to claim 7 wherein said one selected control signal selected by said second comparator means is the one having the lower value.

9. In a refrigeration system adapted for cooling a fluid medium, said refrigeration system being of the type including a refrigerant; an absorbent having an affinity for said refrigerant; evaporator means for bringing said refrigerant into heat transfer relationship with said fluid medium, said evaporator means having an inlet for receiving fluid medium to be cooled and an outlet for discharging cooled fluid medium; absorber means in communication with said evaporator means for removing refrigerant vapor therefrom; means for supplying a concentrated absorbent-refrigerant solution to said absorber means; means for cooling said absorber means to maintain the pressure therein below the pressure in said evaporator means whereby said refrigerant vapor migrates to said absorber means to combine with said concentrated solution to produce a dilute solution; concentrator means for removing a portion of said refrigerant from said dilute solution for recirculation to said evaporator means and for providing said concentrated solution; means for supplying dilute solution to said concentrator means; and means for controlling the concentration of said concentrated solution supplied to said absorber means for controlling the refrigeration capacity of said system, the improvement in said refrigeration system comprising:

means disposed for sensing the variations in temperature at said evaporator inlet and outlet and within said absorber means for providing first, second and third tracking signal outputs indicative of said sensed temperature variations, said first tracking signal output being indicative of the variations in temperature of said fluid at said evaporator inlet, said second tracking signal output being indicative of the variations in temperature of said fluid at said evaporator outlet and said third tracking signal output being indicative of the variations in temperature within said absorber means;

first comparator means operatively connected to said first and third tracking signal outputs for comparing said first and third tracking signals and selecting one of said tracking signal dependent on its relative value as compared with the other of said tracking signals and for providing a first control signal output indicative of said one selected tracking signal;

reset control means operatively connected to said second tracking signal output and to said first control signal output for providing a second control signal output dependent on the relative values of said second tracking signal and said first control signal;

difference means operatively connected to said first and second tracking signal outputs for providing a third control signal output indicative of the difference between said first and second tracking signals; and second comparator means operatively connected to said second and third control signal outputs for comparing said second and third control signals and selecting one of said last mentioned control signals dependent upon its relative value as compared with the other control signal and for providing a fourth control signal output indicative of said one selected control signal, said fourth control signal output being connected to said concentration control means for controlling the operation thereof dependent on the value of said fourth control signal.

10. The refrigeration system according to claim 1 wherein said sensing means comprises a first temperature sensor disposed at said evaporator inlet, the output of said first temperature sensor comprising said first tracking signal output, a second temperature sensor disposed at said evaporator outlet, the output of said second temperature sensor comprising said second tracking signal output, and a third temperature sensor disposed within said absorber means, the output of said third temperature sensor comprising said third tracking signal output.

11. The refrigeration system according to claim 9 wherein said sensing means includes means for setting each of said tracking signal outputs to provide predetermined output signal at predetermined temperatures, and wherein the absolute value of the change in each of said tracking signal outputs in response to a given change in temperature is the same.

12. The refrigeration system according to claim 11 wherein said first and second tracking signals increase in response to an increase in the temperature sensed by their respective temperature sensors and decrease in response to a decrease in the temperature sensed by their respective temperature sensors and wherein said third tracking signal decreases in response to an increase in the temperature sensed by the third temperature sensor and increases in response to a decrease in the temperature sensed by the third temperature sensor.

13. The refrigeration system according to claim 12 wherein said one selected tracking signal selected by said first comparator means is the one having the lower value.

14. The refrigeration system according to claim 13 wherein said second control signal output provided by said reset control means increases in response to an increase in either said second tracking signal output or said first control signal output and decreases in response to a decrease in either said second tracking signal output or said first control signal output.

15. The refrigeration system according to claim 14 wherein said third control signal output provided by said difference means increases in response to an increase in the difference between said first and second tracking signals and decreases in response to a decrease in the difference between said first and second tracking signals.

16. The refrigeration system according to claim 15 wherein said one selected control signal selected by said second comparator means is the one having the lower value.

* * * * *